US010752388B2

United States Patent
Rahm et al.

(10) Patent No.: US 10,752,388 B2
(45) Date of Patent: Aug. 25, 2020

(54) COVER MATERIAL EDGE FOLDING APPARATUS

(71) Applicants: Richard H. Rahm, Monclova, OH (US); Stephen H. Rahm, Monclova, OH (US)

(72) Inventors: Richard H. Rahm, Monclova, OH (US); Stephen H. Rahm, Monclova, OH (US)

(*) Notice: Subject to any disclaimer, the term of this patent is extended or adjusted under 35 U.S.C. 154(b) by 379 days.

(21) Appl. No.: 15/902,991

(22) Filed: Feb. 22, 2018

(65) Prior Publication Data

US 2018/0237176 A1  Aug. 23, 2018

Related U.S. Application Data

(60) Provisional application No. 62/461,810, filed on Feb. 22, 2017.

(51) Int. Cl.
| | |
|---|---|
| *B65B 11/16* | (2006.01) |
| *B65B 39/06* | (2006.01) |
| *B65B 39/00* | (2006.01) |
| *B32B 1/00* | (2006.01) |

(Continued)

(52) U.S. Cl.
CPC ............ *B65B 11/16* (2013.01); *B32B 1/00* (2013.01); *B32B 9/025* (2013.01); *B65B 39/007* (2013.01); *B65B 39/06* (2013.01); *B65H 45/04* (2013.01)

(58) Field of Classification Search
CPC ......... B65B 11/16; B65B 11/18; B65B 11/28; B65B 11/36; B32B 9/025; B32B 38/0012; B32B 39/06; B32B 39/007; B32B 1/00; B32B 2605/08; B32B 2605/003; B23C 43/18; B29C 53/04; B29C 53/066; B29C 53/36; B29Q 1/00; B29Q 1/0063; B29Q 1/03; B29Q 1/25; B29Q 1/42; B29Q 1/56; B29Q 1/62; B29Q 3/00; B29Q 3/04;

(Continued)

(56) References Cited

U.S. PATENT DOCUMENTS

| | | |
|---|---|---|
| 5,139,604 A | 8/1992 | Mitchell |
| 7,874,832 B2 | 1/2011 | Kujawa |

(Continued)

FOREIGN PATENT DOCUMENTS

DE  4308925 A1 * 2/1995 ............. B60R 13/02

OTHER PUBLICATIONS

English machine translation DE 4308925 (Year 1995).*
STIC search results (Year 2020).*

*Primary Examiner* — Monica S Carter
*Assistant Examiner* — Alberto Saenz
(74) *Attorney, Agent, or Firm* — Dunlap Bennett & Ludwig, PLLC

(57) ABSTRACT

An edge folding apparatus. The edge folding apparatus includes a fixed base having a horizontal track. A fixed guide block includes either a channel or a peg. The channel includes a horizontal portion leading to a vertical portion. A sliding base is slidably coupled to a horizontal track. The sliding base includes a vertical track. A tool mount block is slidably coupled to the vertical track. The tool mount block includes the other of the channel or the peg. The peg slides along and is guided by the channel. A first linear actuator pushes the sliding base along the horizontal track and a second linear actuator pushes the tool mount block along the vertical track.

12 Claims, 4 Drawing Sheets

(51) Int. Cl.
*B32B 9/02* (2006.01)
*B65H 45/04* (2006.01)

(58) Field of Classification Search
CPC ... B29Q 3/06; B25B 27/0035; B25B 27/0092; B25B 27/02
USPC .......... 29/243.5; 269/114, 116, 281.1, 281.2, 269/281.3, 281.4, 281.5, 281.6, 287, 291, 269/313, 314; 156/227
See application file for complete search history.

(56) References Cited

U.S. PATENT DOCUMENTS

| | | | |
|---|---|---|---|
| 9,302,458 B2 * | 4/2016 | Huelke | B32B 38/0012 |
| 2011/0274921 A1 * | 11/2011 | Li | B29C 53/36 |
| | | | 428/354 |

* cited by examiner

COVER MATERIAL EDGE FOLDING APPARATUS

CROSS-REFERENCE TO RELATED APPLICATION

This application claims the benefit of priority of U.S. provisional application No. 62/461,810, filed Feb. 22, 2017, the contents of which are herein incorporated by reference.

BACKGROUND OF THE INVENTION

The present invention relates to attaching cover materials to panels, and more particularly to an apparatus that folds cover materials over the edges of panels.

Current automatic and manual devices for wrapping cover materials around the edge of automotive and consumer products do not work well. The devices require very narrow process variations and frequently lose control of the material, which causes a poor quality final product, a higher rate of scrapping parts, and increased maintenance costs.

As can be seen, there is a need for an improved apparatus that folds cover materials over the edges of panels.

SUMMARY OF THE INVENTION

In one aspect of the present invention, an edge folding apparatus comprises: a fixed base comprising a horizontal track; a fixed guide block comprising one of a channel and a peg, the channel comprising a horizontal portion leading to a vertical portion; a sliding base slidably coupled to the horizontal track, the sliding base comprising a vertical track; a tool mount block configured to support a folder tool and slidably coupled to the vertical track, the tool mount block comprising the other of the channel and the peg, wherein the peg is guided within the channel; a first linear actuator configured to move the sliding base along the horizontal track; and a second linear actuator configured to move the tool mount block along the vertical track.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
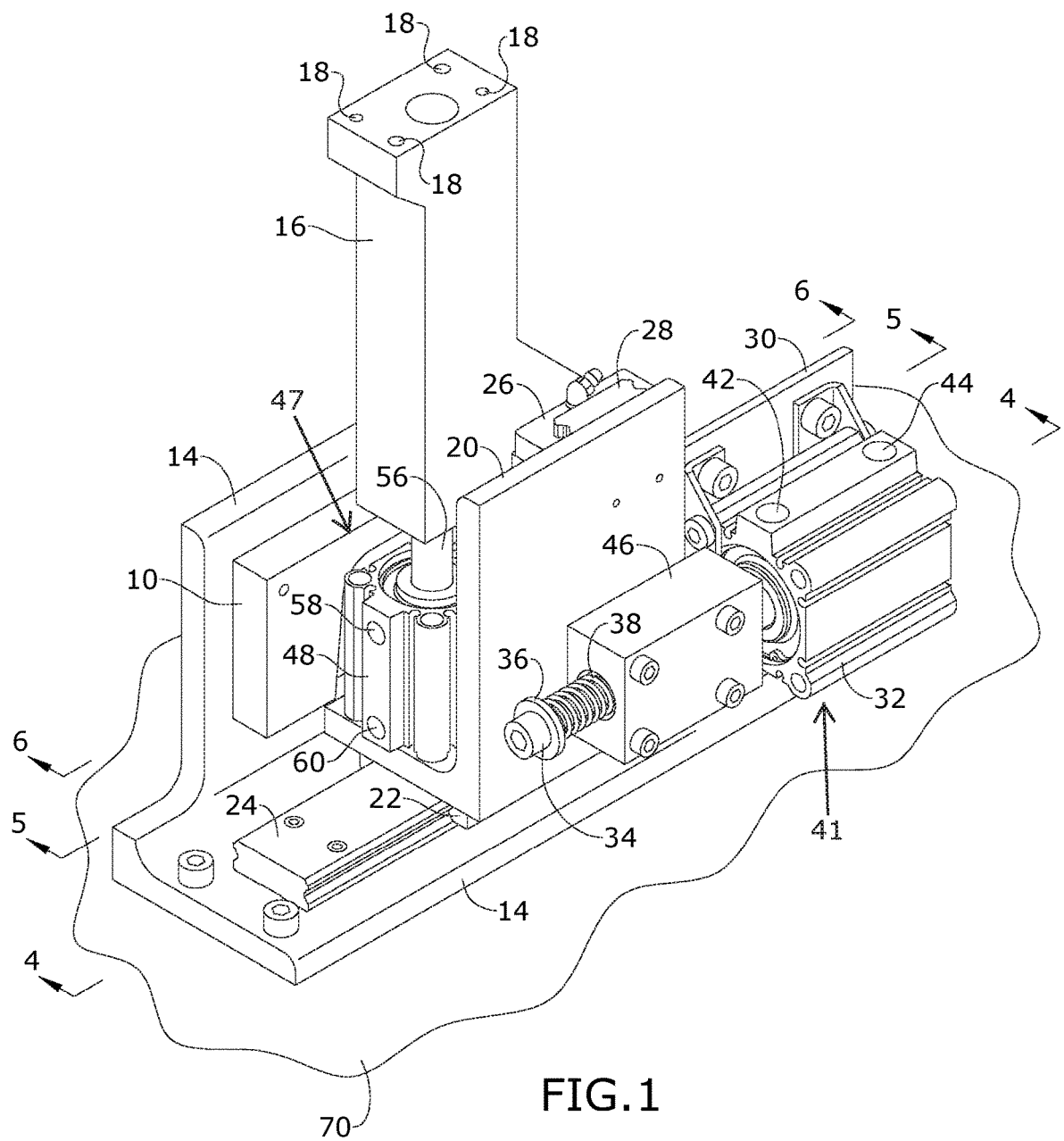
FIG. 1 is a perspective view of an embodiment of the present invention, illustrated without the folder tool.
Figure 2:
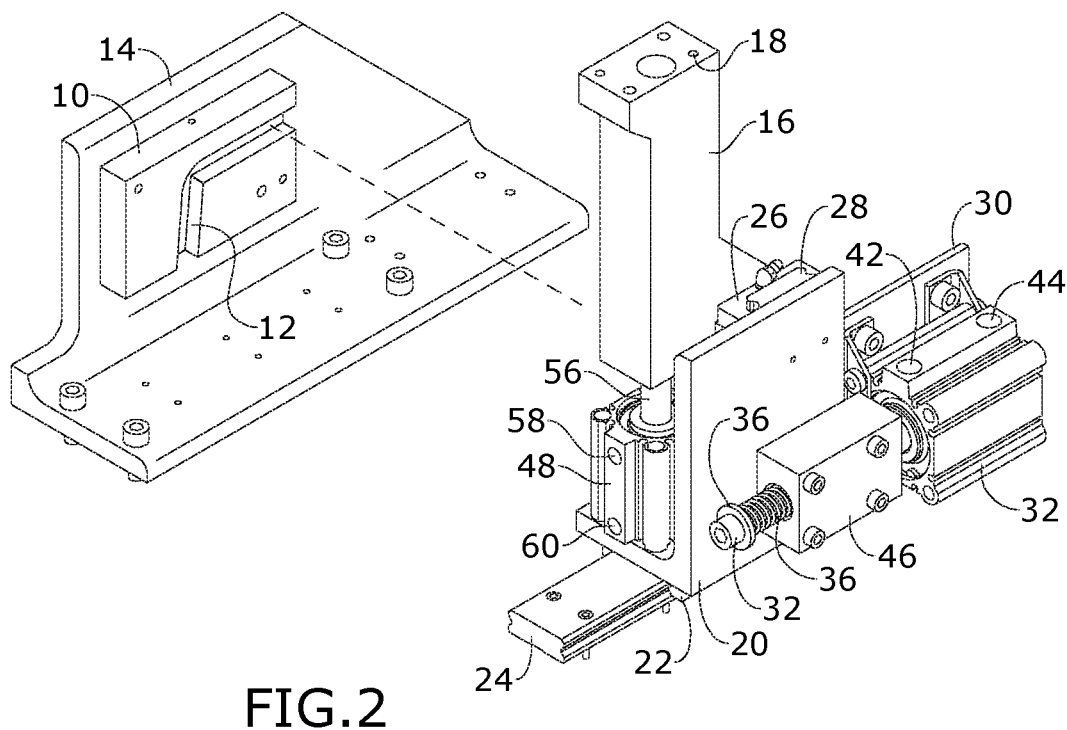
FIG. 2 is a partial front exploded view of an embodiment of the present invention.
Figure 3:
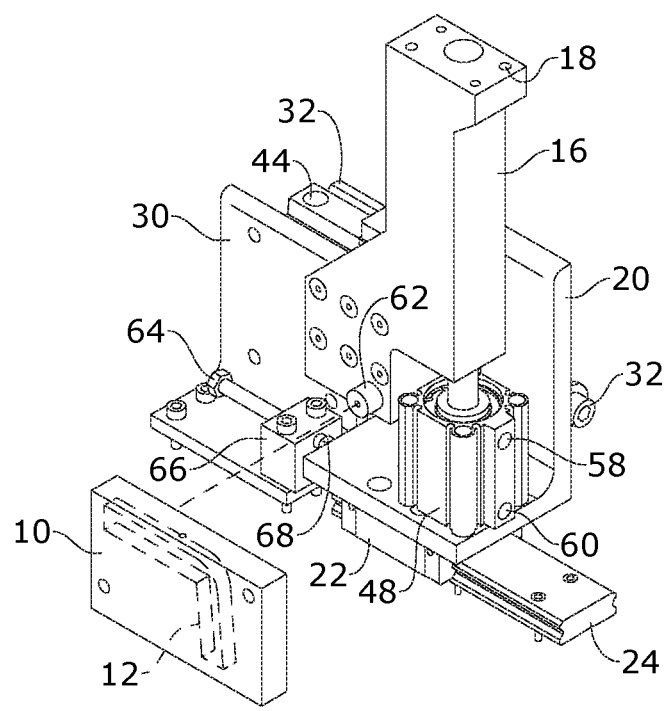
FIG. 3 is a partial rear exploded view of an embodiment of the present invention, with the fixed base removed for illustrative clarity.
Figure 4:
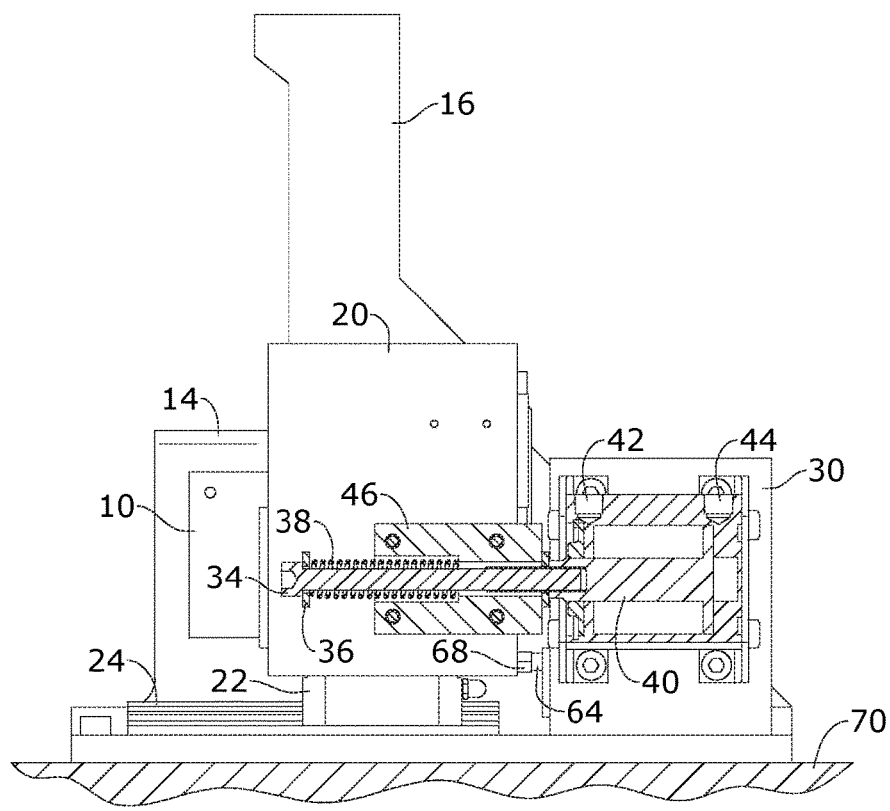
FIG. 4 is a section view of the present invention, taken along line 4-4 in FIG. 1.
Figure 5:
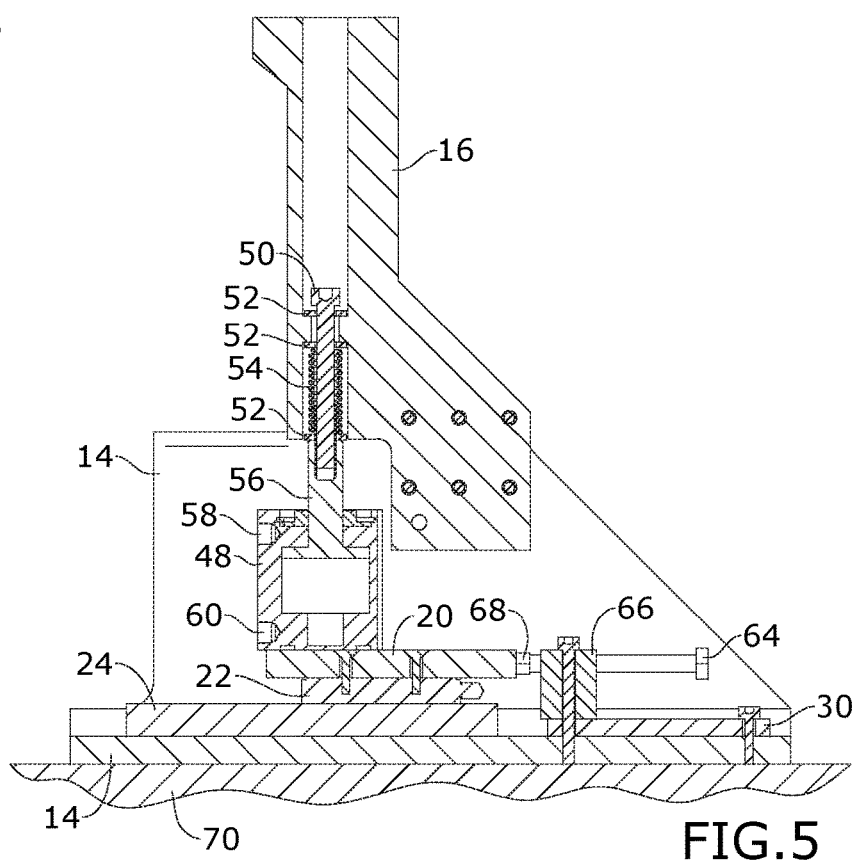
FIG. 5 is a section view of the present invention, taken along line 5-5 in FIG. 1.
Figure 6:
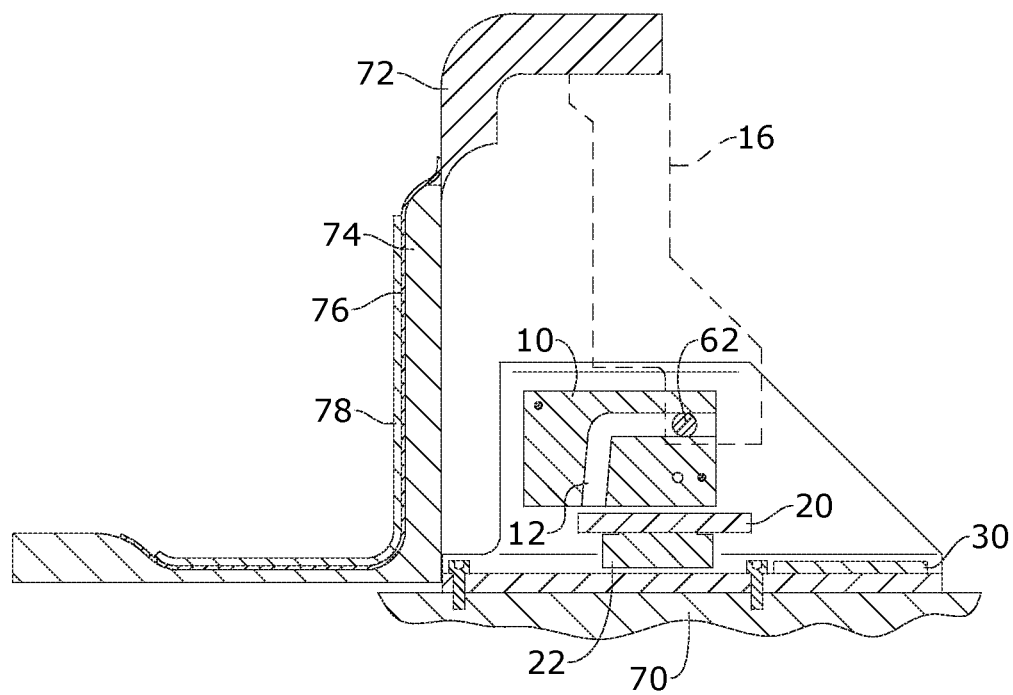
FIG. 6 is a section view of the present invention, taken along line 6-6 in FIG. 1, with the folder tool attached.
Figure 7:
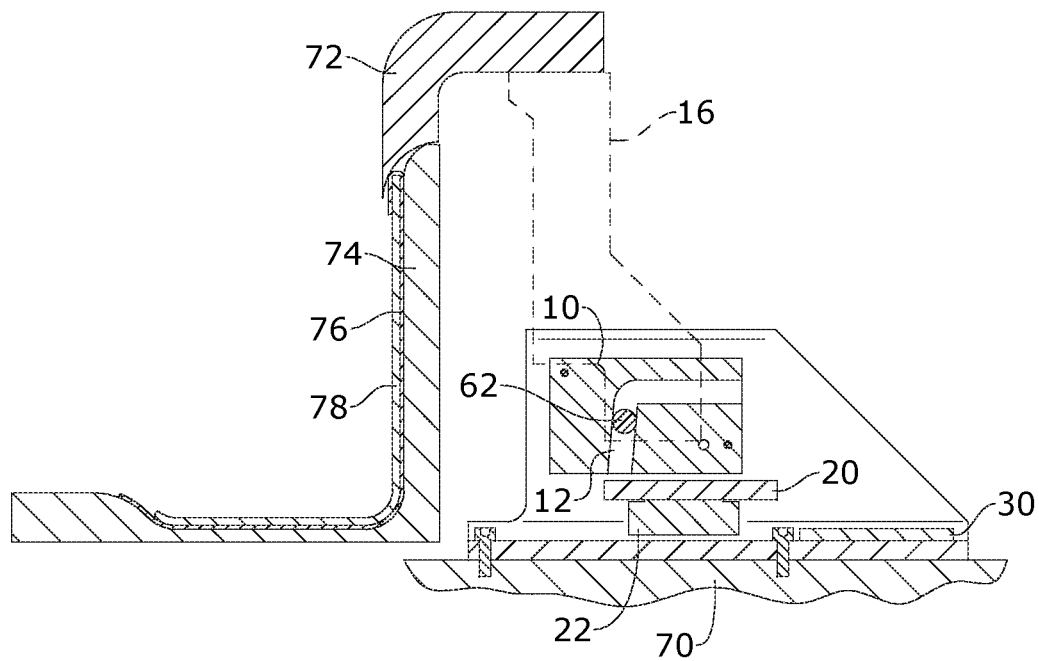
FIG. 7 is a section view of the present invention illustrating the folder tool folding material over a substrate.

Referring to FIGS. 1 through 7, the present invention includes an edge folding apparatus. The edge folding apparatus includes a fixed base 14 having a horizontal track 24. The fixed base 14 is mounted to a mounting surface 70. The edge folding apparatus further includes a fixed guide block 10 having either a channel 12 or a peg 62. The channel 12 includes a horizontal portion leading to a vertical portion. A sliding base 20 is slidably coupled to a horizontal track 24. The sliding base 20 includes a vertical track 28. A tool mount block 16 is slidably coupled to the vertical track 28. The tool mount block 16 includes the other of the channel 12 or the peg 62. The peg 62 slides along and is guided by the channel 12. A first linear actuator 41 pushes the sliding base 20 along the horizontal track 24 and a second linear actuator 47 pushes the tool mount block 16 along the vertical track 28.

A folder tool 72 is secured to the tool mount block 16 by bolts and mount holes 18. A panel support 74 holds a substrate 78, such as a panel of an automobile. A material 76, such as cloth, leather, etc., is adhered to the substrate 78. The first linear actuator 41 pushes the sliding base 20 along the horizontal track 24, which in turn pushes the tool mount block 16 forward. The peg 62 slides along the horizontal portion of the channel 12 and the folder tool 72 is pushed forward against an upper edge of the attached material 76. Once the peg 62 reaches the vertical portion of the channel 12, the peg 62 and tool mount block 16 are pulled downward by the second linear actuator 47 along the vertical portion of the channel 12. The folder tool 72 drops downward with the tool mount block 16, thereby folding the upper edge of the attached material 76 around an upper edge of the substrate 78. Heat or an adhesive may be applied to adhere the upper edge of the material 76 to the substrate 78. The second actuator 47 then pushes the tool mount block 16 upward along the vertical portion of the channel 12 and back to the horizontal portion of the channel 12. The first actuator 41 then pulls the tool mount block 16 back along the horizontal portion, completing the process.

In certain embodiments, the fixed base 14 includes a horizontal portion and a vertical portion. The horizontal track 24 is coupled to the horizontal portion and the fixed guide block 10 is coupled to the vertical portion. In certain embodiments, the fixed guide block 10 includes the channel 12 and the peg 62 is coupled to the tool mount block 16. The vertical portion of the channel 12 may be slightly above 90 degrees relative to the horizontal portion, such as between about 91 degrees and about 100 degrees, such as at about 95 degrees. In such embodiments, the folder tool 72 is guided along substantially the same angle as the upper surface of the panel support 74, precisely folding the material 76 over the upper edge and against the substrate 78. In certain embodiments, the peg 62 has a cylinder shape and an outer corner connecting the vertical portion and the horizontal portion of the channel 12 is rounded, providing for a smooth transition between the horizontal and the vertical movement of the folder tool 72.

In certain embodiments, the sliding base 20 includes a horizontal portion and a vertical portion. The vertical track 28 is coupled to an inner surface of the vertical portion and the second linear actuator 47 is coupled to an upper surface of the horizontal portion. A horizontal bearing block 22 is coupled to the lower surface of the horizontal portion. The horizontal bearing block 22 slides along the horizontal track 24. In certain embodiments, a vertical bearing block 26 is coupled to the tool mount block 16. The vertical bearing block 26 slides along the vertical track 28.

The first linear actuator 41 may be a pneumatic actuator and/or a servo actuator. In certain embodiments, a pneumatic cylinder 32 is coupled to the fixed base 14 by a cylinder mount bracket 30. A cylinder rod 40 is operable to slide within the pneumatic cylinder 32. A pressure is applied within the pneumatic cylinder 32 via a first cylinder port 42 and a second cylinder port 44. When the pressure is applied to the second cylinder port 44, the cylinder rod 40 drives the sliding base 20 away from the pneumatic cylinder 32 along the horizontal track 24. When the pressure is applied to the first cylinder port 44, the cylinder rod 40 pulls the sliding base 20 towards the pneumatic cylinder 32 along the horizontal track 24.

In certain embodiments, the sliding base 20 may continue to slide away from the pneumatic cylinder 32 even when the cylinder rod 40 is no longer pushing the sliding base 20. A bolt block 46 is coupled to the vertical portion of the sliding base 20. A cylinder bolt 34 runs through the bolt block 46. The cylinder bolt 34 includes a proximal end mechanically fastened to the cylinder rod 40 and a distal end disposed beyond the bolt block 46. A spring 38 is disposed around the cylinder bolt 34 in between a flange 36 of the distal end and an internal flange of the bolt block 46. The cylinder rod 40 may push the tool mount block 16 along the horizontal portion of the channel 12. When the tool mount block 16 reaches the vertical portion, the tool mount block 16 is pulled along the vertical portion at a slight angle away from the pneumatic cylinder 32. At this point, the bolt block 46 slides towards the distal end of the cylinder bolt 34 against the bias of the spring 38. This provides for a controlled smooth transition from the horizontal portion of the channel 12 to the vertical portion of the channel 12.

The second linear actuator 47 may also be a pneumatic actuator and/or a servo actuator. In certain embodiments, a second pneumatic cylinder 48 is coupled to the sliding base 20. A second cylinder rod 56 is operable to slide within the second pneumatic cylinder 48. A pressure is applied within the second pneumatic cylinder 48 via a first cylinder port 58 and a second cylinder port 60. When the pressure is applied to the first cylinder port 58, the second cylinder rod 56 pulls the tool mount block 16 towards the second pneumatic cylinder 48 along the vertical track 28. When the pressure is applied to the second cylinder port 60, the second cylinder rod 56 drives the tool mount block 16 away from the second pneumatic cylinder 48 along the vertical track 28.

In certain embodiments, the tool mount block 16 may continue to slide away from the second pneumatic cylinder 48 even when the second cylinder rod 56 is no longer pushing the tool mount block 16. A second cylinder bolt 50 includes a proximal end mechanically fastened to the second cylinder rod 56 and a distal end within an internal channel of the tool mount block 16. A second spring 54 is disposed around the second cylinder bolt 50 in between a flange 52 of the distal end and an internal flange of the tool mount block 16. The second cylinder rod 56 may push the tool mount block 16 back up the vertical portion of the channel 12. When the tool mount block 16 reaches the horizontal portion, the first linear actuator 41 may pull the tool mount block 16 back along the horizontal portion. At this point, the tool mount block 16 slides upwards along the second cylinder bolt 50 against the bias of the second spring 54. This provides for a controlled smooth transition from the vertical portion of the channel 12 to the horizontal portion of the channel 12.

The sliding base 20 may include an adjustable starting and ending point to adjust to different sized substrates 78. In such embodiments, the present invention includes a stop bolt block 66 coupled to the fixed base 14. A bolt runs through the stop bolt block 66. The bolt includes an adjustable stop bolt nut 64 and a fixed stop bolt nut 68. The adjustable stop bolt nut 64 may adjust the bolt along the stop bolt block 66 at different distances to prevent the sliding base 20 from sliding along the horizontal track 24 beyond a designate area.

It should be understood, of course, that the foregoing relates to exemplary embodiments of the invention and that modifications may be made without departing from the spirit and scope of the invention as set forth in the following claims.

What is claimed is:

1. An edge folding apparatus comprising:
    a fixed base comprising a horizontal track;
    a fixed guide block comprising one of a channel and a peg, the channel comprising a horizontal portion leading to a vertical portion;
    a sliding base slidably coupled to the horizontal track, the sliding base comprising a vertical track;
    a tool mount block configured to support a folder tool and slidably coupled to the vertical track, the tool mount block comprising the other of the channel and the peg, wherein the peg is guided within the channel;
    a first linear actuator configured to move the sliding base along the horizontal track; and
    a second linear actuator configured to move the tool mount block along the vertical track.

2. The edge folding apparatus of claim 1, further comprising:
    the folder tool secured to the tool mount block, the folder tool comprising a leading edge comprising a curve; and
    a panel support configured to hold a substrate comprising an attached material, wherein
    the first linear actuator pushes the folder tool forward against an upper edge of the attached material,
    the second linear actuator pulls the folder tool downward when the peg reaches the vertical portion of the channel, thereby folding the upper edge of the attached material around an upper edge of the substrate, and
    the second linear actuator pushes the folder tool back upward.

3. The edge folding apparatus of claim 1, wherein the fixed base comprises a horizontal portion and a vertical portion, wherein the horizontal track is coupled to the horizontal portion and the fixed guide block is coupled to the vertical portion.

4. The edge folding apparatus of claim 1, wherein the sliding base comprises a horizontal portion and a vertical portion, wherein the vertical track is coupled to the vertical portion and the second linear actuator is coupled to the horizontal portion.

5. The edge folding apparatus of claim 4, wherein the first linear actuator and the second linear actuator are pneumatic actuators.

6. The edge folding apparatus of claim 5, wherein the first linear actuator comprises a pneumatic cylinder coupled to the fixed base and a cylinder rod operable to slide within the pneumatic cylinder, wherein when pressure is applied within the pneumatic cylinder, the cylinder rod drives the sliding base away from the pneumatic cylinder along the horizontal track.

7. The edge folding apparatus of claim 6, further comprising a bolt block coupled to the vertical portion of the sliding base, a cylinder bolt running through the bolt block and comprising a proximal end mechanically fastened to the cylinder rod and a distal end disposed beyond the bolt block, and a spring disposed around the cylinder bolt in between a flange of the distal end and an internal flange of the bolt block.

8. The edge folding apparatus of claim 5, wherein the second linear actuator comprises a pneumatic cylinder coupled to the sliding base and a cylinder rod operable to slide within the pneumatic cylinder, wherein when pressure is applied within the pneumatic cylinder, the cylinder rod drives the tool mount block away from the pneumatic cylinder along the vertical track.

9. The edge folding apparatus of claim 8, further comprising a cylinder bolt mechanically fastened to the cylinder rod and running through the tool mount block, and a spring disposed around the cylinder bolt in between a flange of a distal end and an internal flange of the tool mount block.

10. The edge folding apparatus of claim 1, wherein the fixed guide block comprises the channel and the peg is coupled to the tool mount block.

11. The edge folding apparatus of claim 1, the vertical portion of the channel is slightly above 90 degrees relative to the horizontal portion.

12. The edge folding apparatus of claim 1, wherein the peg comprising a cylinder shape and an outer corner connecting the vertical portion and the horizontal portion of the channel is rounded.

* * * * *